United States Patent
Albert

(10) Patent No.: US 6,913,310 B2
(45) Date of Patent: Jul. 5, 2005

(54) GLASS ROOF FOR A MOTOR VEHICLE

(75) Inventor: Jean-Paul Albert, St. Pierre des Echaubrognes (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/601,192

(22) Filed: Jun. 23, 2003

(65) Prior Publication Data

US 2004/0104603 A1 Jun. 3, 2004

(30) Foreign Application Priority Data

Jun. 21, 2002 (FR) .............................................. 02 07684

(51) Int. Cl.⁷ .................................................. B60J 7/00
(52) U.S. Cl. ................... 296/210; 296/216.09
(58) Field of Search ............................ 296/201, 96.21, 296/84.1, 210, 216.06, 146.15, 213, 211, 215, 216.09, 107.09, 146.14, 190.1; 52/208, 204.591, 200; 136/251; 428/192

(56) References Cited

U.S. PATENT DOCUMENTS

| | | | | |
|---|---|---|---|---|
| 4,613,534 A | * | 9/1986 | Blizzard et al. | 428/57 |
| 5,213,626 A | * | 5/1993 | Paetz | 136/251 |
| 5,524,955 A | * | 6/1996 | Brocke et al. | 296/216.09 |
| 5,779,301 A | * | 7/1998 | Ito | 296/217 |
| 5,995,272 A | * | 11/1999 | Patz | 359/265 |
| 6,240,677 B1 | * | 6/2001 | Baumann | 49/479.1 |
| 6,273,500 B1 | * | 8/2001 | Boersma et al. | 296/216.09 |
| 6,318,798 B1 | * | 11/2001 | Bergmiller | 296/216.09 |
| 6,331,065 B1 | | 12/2001 | Wilms | |
| 6,375,254 B1 | * | 4/2002 | Patz | 296/216.09 |
| 6,471,283 B2 | * | 10/2002 | Windpassinger et al. | 296/146.14 |
| 6,517,150 B2 | * | 2/2003 | De Gaillard et al. | 296/216.09 |
| 6,540,289 B2 | * | 4/2003 | Bergmiller et al. | 296/216.09 |
| 6,606,778 B1 | * | 8/2003 | Krass et al. | 296/201 |
| 2002/0021029 A1 | | 2/2002 | Bohm et al. | |

FOREIGN PATENT DOCUMENTS

| DE | 199 56 567 A1 | 6/2001 |
|---|---|---|
| EP | 0 429 361 A1 | 5/1991 |

* cited by examiner

*Primary Examiner*—Kiran B. Patel
(74) *Attorney, Agent, or Firm*—Nixon Peabody LLP; David S. Safran

(57) ABSTRACT

A glass roof (1) for closing an opening in a motor vehicle roof, the opening being bordered by a stop which is made as a support surface, and the roof (1) having a glass pane (2) with an inner peripheral surface (3) which is suited for cementing to the indicated support surface. At least part of the inner peripheral surface (3) of the glass pane (2) is coated with a material (4a, 4b) with an outside surface (5a, 5b) which is to be opposite the support surface running essentially parallel to the corresponding section of the indicated support surface.

4 Claims, 3 Drawing Sheets

GLASS ROOF FOR A MOTOR VEHICLE

BACKGROUND OF THE INVENTION

1. Field of the Invention

This invention relates to a glass roof for closing an opening provided in the roof of a motor vehicle.

2. Description of Related Art

It is known that the roof of a motor vehicle can be at least partially made of a glass pane. Normally, the opening provided in the roof is bordered by a support surface which is used as a stop and which is designed for holding the peripheral edge of the glass pane.

Specifically, the opening generally extends in the transverse direction between the sides of the body, and in the lengthwise direction, between the front roof element which separates the roof from the windshield, and the rear roof element which separates the roof from the back windshield. The side roof elements, the front roof element and the rear roof element each have an individual peripheral stop on the edges facing the opening.

The combination of these four individual peripheral stops forms the support surface for the peripheral edge of the glass pane with a fixed connection which is ordinarily formed by means of cementing.

In practice, a motor vehicle with a glass roof is generally derived simply from a conventional model with a sheet metal roof. This means that the glass pane must be cemented on a normal body, therefore on a non-specific support surface. However, since this support surface, which is used as a stop, is designed to be welded on the base to the sheet metal roof, it does not impose a special requirement for flatness and/or stiffness or continuity.

In the case of cementing the glass pane, this constitutes a major difficulty.

The technique of a fixed connection by means of cementing presupposes a uniform, continuous support surface which runs essentially parallel to the element which is to be permanently connected. In fact, the uniformity and continuity of the adhesive coating are no longer ensured, if there are faults of flatness and/or discontinuities. This results in a major risk with respect to leaks as soon as the glass pane is inserted. If this difficulty is to be eliminated and/or if the distance between the support surface and the surface of the elements which is to be securely joined has overly large irregularities, there can be the tendency to add cement. Unfortunately, in the area of cementing technology, it is known that an excess of cement is not at all compatible with a faultless connection.

SUMMARY OF THE INVENTION

Thus, a primary object of this invention is to provide a glass roof for closing an opening in a motor vehicle roof, the opening being bordered by a stop which is used as a support surface, in which a glass pane has an inner peripheral edge which is suited for cementing to the indicated support surface, and the glass roof makes it possible to avoid the problems associated with the prior art, regardless of the profile of the support surface, and enabling, at the same time, effective cementing and increased tightness of the connection which has been formed in this way.

This object is achieved in that at least part of the inner peripheral surface of the glass pane is coated with a material with an outside surface which is to be opposite the support surface running essentially parallel to the corresponding section of the indicated support surface.

Each coated part is thus intended for a sandwich arrangement between one part of the indicated inner peripheral surface and a corresponding part of the indicated support surface. The object is thus, depending on the location of the slope, to equalize flatness faults and/or discontinuities of the support surface and/or overly great irregularities in the distance between the inner peripheral surface and the indicated support surface.

Therefore, the thickness of each coated part can be different depending on the profile of the corresponding part of the support surface, but also depending on the desired relative position between the glass pane and the indicated support surface, viewed overall.

Here, a fixed connection between the inner peripheral surface and the support surface is attempted by applying a constant thickness of mounting cement to secure the mounting and perfect tightness.

The invention, defined in this way, offers the advantage of being able to be matched to a standard motor vehicle, in which basically there is a sheet metal roof. In fact, it is more economical to adapt glass roofs instead of correcting the support surface of any standard vehicle.

The invention also relates to the features which result from the following description and which should be considered individually or in all possible technical combinations.

The following description, which is given as a non-restrictive example, better illustrates how the invention can be executed and reference is made in the specification to the accompanying drawings.

DETAILED DESCRIPTION OF THE INVENTION

Figure 1:
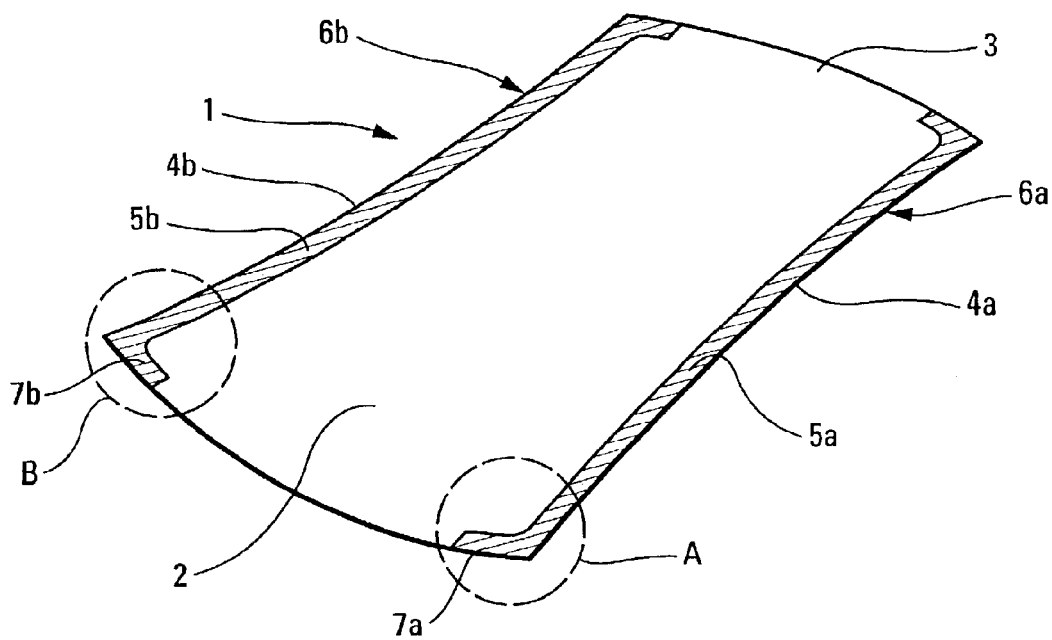
FIG. 1 is a schematic bottom perspective view of a glass roof in accordance with the invention.
Figure 3:
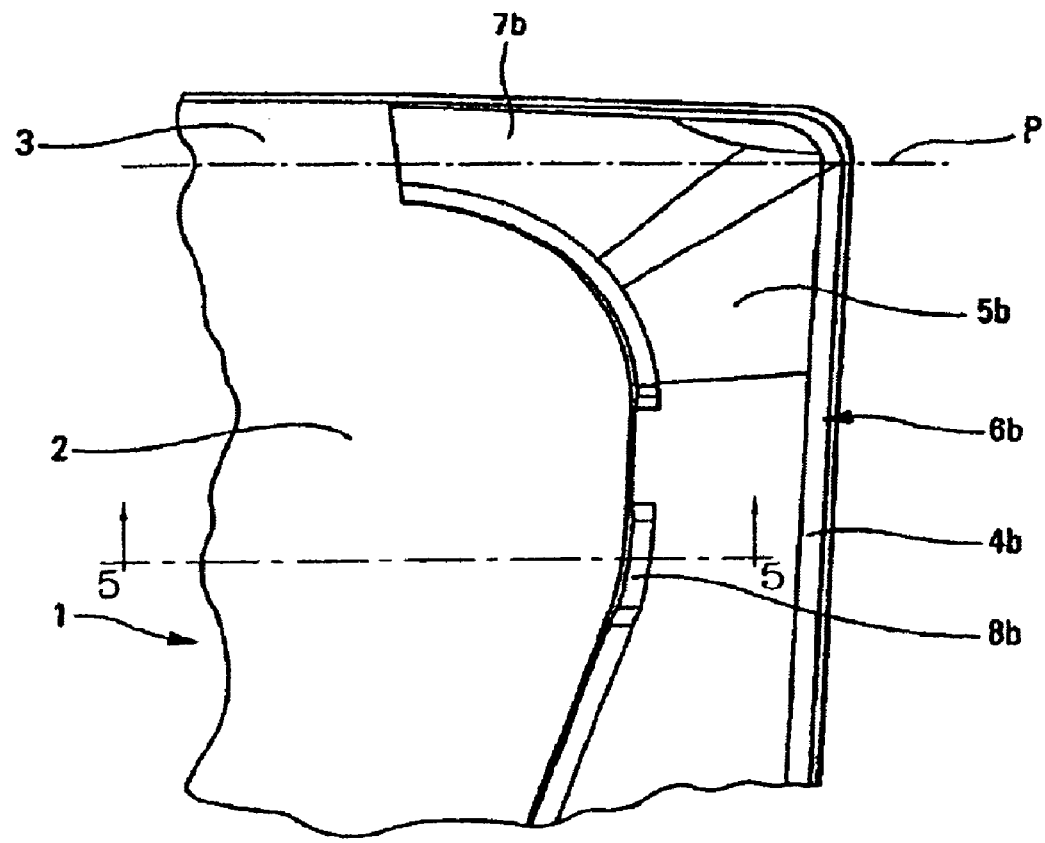
FIG. 3 is a bottom view of the circled detail B in FIG. 1.

The glass roof 1 shown in FIG. 1 is designed to close an opening O provided in a motor vehicle roof, a portion of which is represented in broken lines in FIG. 3. This opening is bordered, in the conventional manner, by a stop which forms the support surface S as indicated to the left of support surface S in FIG. 5, and the roof has a glass pane 2 with an inner peripheral surface 3 which can be cemented to the indicated support surface. The peripheral surface 3 here is defined as any surface located on the edge and on the inside of the glass pane 2.

According to the Invention, at least part of the inner peripheral surface 3 at an underside of the glass pane 2 is coated with a material which forms a compensation part 4a, 4b, with an outside surface 5a, 5b which is intended to be opposite an upper side of the support surface.

A coated part 6a, 6b thus allows equalization of any deviation in parallelism and/or in the distance between the inner peripheral surface 3 and the support surface. Cementing can thus be advantageously produced with a constant cement thickness to achieve a fixed connection and optimum tightness.

In this special embodiment, which was used for illustrating the invention, only the two lengthwise edges of the glass pane 2 are completely coated; the corresponding coated parts 6a, 6b are completely symmetrical here. The sections of the inner peripheral surfaces 3 corresponding to the two side edges of the glass pane 2 are coated only partially, specifically at their respective ends. In fact, side areas coater are merely simple lateral setbacks 7a, 7b which proceed from the coated parts 6a, 6b which run essentially in the lengthwise direction.

Figure 2:
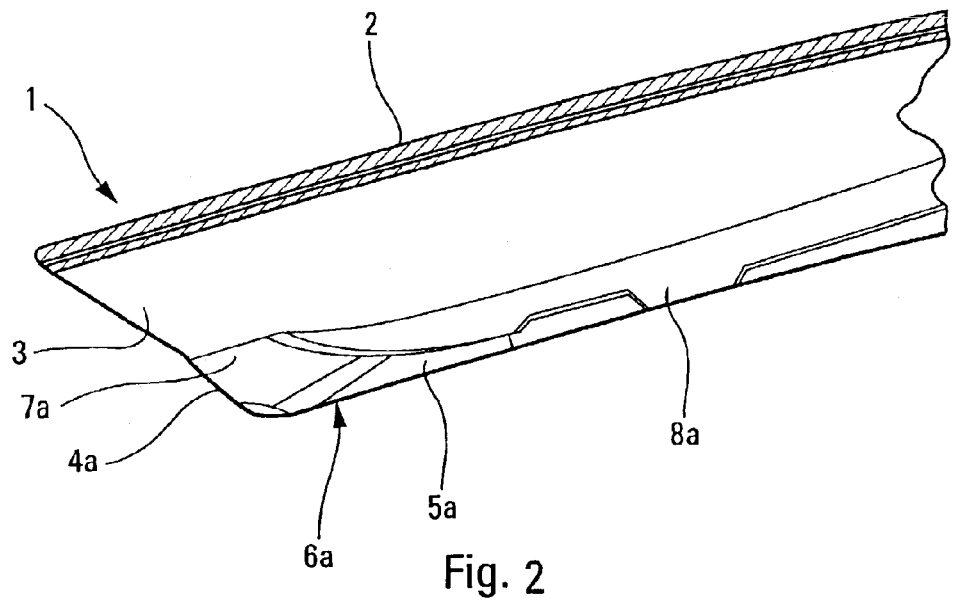
FIG. 2 is a schematic bottom perspective view of the circled detail A in FIG. 1.

As can be recognized with greater precision in FIG. 2, each of the coated parts 6a, 6b has a complex shape which results from the frequently stressed profile of the support surface. A convex section of the support surface corresponds to each concave section of the coated part 6a, 6b and vice versa.

According to one feature of the invention, each coated section 6a, 6b has a shape which corresponds essentially to the space which separates the inner peripheral surface 3, on the one hand, and the support surface coated with a constant and adequate cement layer from one another, on the other, when the relative arrangement of the indicated inner peripheral surface 3 and the indicated support surface is optimum.

Thus, each coated part has a shape which is essentially complementary to the corresponding section of the support surface S, so that it forms an ideal intermediate element for connection of these two elements which almost never complement one another in practice. Put another way, the coated parts 6a, 6b constitute compensation parts as described below. Furthermore, it goes without saying that uniformity and continuity of the cement layer C constitute essential criteria for faultless cementing.

It can also be seen in FIG. 2 that the glass pane in this embodiment has a multilayer structure.

FIG. 3 illustrates the section B circled in FIG. 1 in order to easily show, in relation to the circled section A shown in FIG. 2, that the coated parts 6a, 6b are completely symmetrical.

Figure 4:
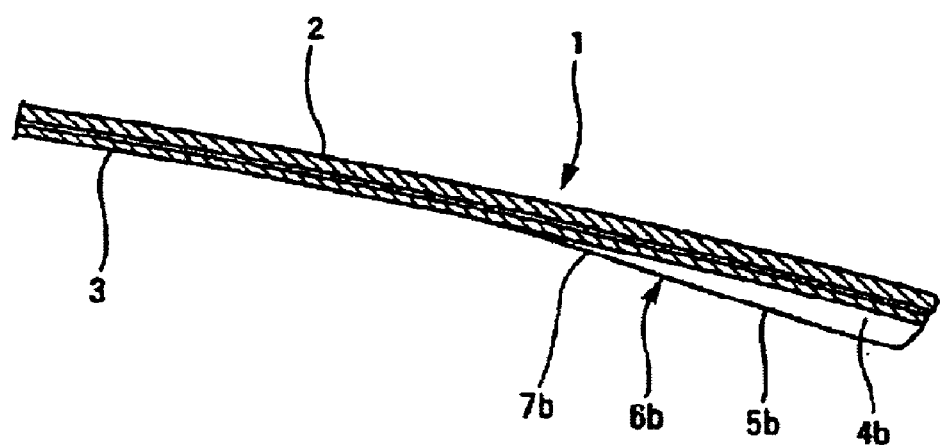
FIGS. 4 & 5 sectional views taken along lines P & 5—5, respectively, FIG. 3.

In addition to the multilayer structure of the glass pane 2, FIG. 4 also has a beveled profile of the setback 7b which is formed of one piece with the coated part 6b.

As can be seen in FIGS. 2 & 3, each coated part 6a, 6b has at least one projecting part 8a, 8b which is made as a calibration stop, with a height which corresponds to the desired cement thickness. The free end of each calibration stop 8a, 8b is thus designed to come into contact with an upper side of the support surface. The presence of these projecting calibration stops 8a, 8b thus enables positioning of the coated glass pane 2 relative to the support surface at a certain relative distance which corresponds to the desired cement thickness. It is especially advantageous that along each coated part 6a, 6b there are calibration stops 8a, 8b at regular intervals. Thus, as is particularly apparent from FIG. 5, coated part 6a, 6b with its projecting parts 8a, 8b, forms a compensation part with an outside surface engaging on an upper side of the roof support surface S and which compensates for any faults, discontinuities or irregularities in said inner peripheral surface, the outside surface of the compensation material running essentially parallel to and being positioned relative to a corresponding section of the roof support surface S in a manner defining a space of substantially constant height between said outside surface of the compensation material and said roof support surface for receiving a cement layer C of constant thickness.

Of course, the glass roof 1 can be provided with a darkening device which can be deployed parallel to the inside surface of the glass pane 2, especially to limit the greenhouse effect within the vehicle on days with strong incident solar radiation. The darkening device in this case is directly connected securely to the inside of the glass pane 2 so that a genuine, complete module ready for installation results.

What is claimed is:

1. A glass roof, comprising a roof support surface (S) bounding a roof opening (O) and the roof having a glass pane (2) for closing the roof opening that is provided with an inner peripheral surface for cementing to the roof support surfaces, wherein at least part of the inner peripheral surface (3) at an underside of the glass pane is coated with a material forming at least one compensation part (6a, 6b) with an outside surface (end of projects 8a, 8b; see, FIG. 5) engaging on an upper side of the roof support surface (S) and which compensates for any faults, discontinuities or irregularities in said inner peripheral surface, the outside surface of the compensation material running essentially parallel to and being positioned relative to a corresponding section of the roof support surface (S) in a manner defining a space (C) of substantially constant height between said outside surface (5a, 5b) of the compensation material and said roof support surface (S) for receiving a cement layer (C) of constant thickness.

2. The glass roof as claimed in claim 1, wherein each coated part (6a, 6b) has at least one projecting part (8a, 8b) which is made as a calibration stop, with a height which corresponds to the desired cement thickness of the cement layer (C).

3. The glass roof as claimed in claim 2, wherein there are calibration stops (8a, 8b) along each coated compensation part (6a, 6b) at uniform intervals.

4. The glass roof as claimed in claim 1, wherein there are calibration stops (8a, 8b) along each coated part (6a, 6b) at uniform intervals.

* * * * *

UNITED STATES PATENT AND TRADEMARK OFFICE
CERTIFICATE OF CORRECTION

| | | |
|---|---|---|
| PATENT NO. | : 6,913,310 B2 | Page 1 of 1 |
| APPLICATION NO. | : 10/601192 | |
| DATED | : July 5, 2005 | |
| INVENTOR(S) | : Jean-Paul Albert | |

Figure 5:
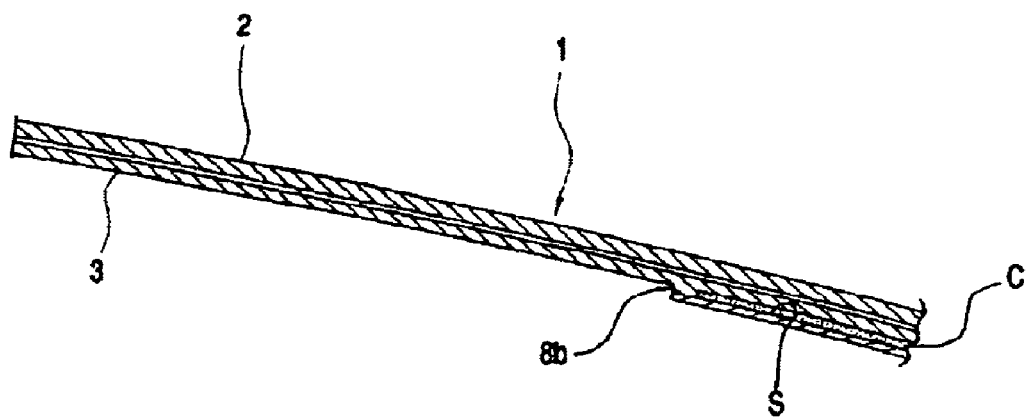

It is certified that error appears in the above-identified patent and that said Letters Patent is hereby corrected as shown below:

In the Drawings, Sheet 3, Figure 5:

The reference numeral 8a should be applied to the same projecting part as the reference numeral 8b is applied to, and the reference numerals 6a, 6b should be applied to the element from which the projecting parts (8a, 8b) project from.

Signed and Sealed this

Sixteenth Day of February, 2010

David J. Kappos
*Director of the United States Patent and Trademark Office*